(12) United States Patent
Laudebat

(10) Patent No.: US 10,123,154 B2
(45) Date of Patent: Nov. 6, 2018

(54) METHOD, SYSTEM AND APPARATUS FOR COMMUNICATION THROUGH WIRELESS CHARGING NETWORK

(71) Applicant: Intel Corporation, Santa Clara, CA (US)

(72) Inventor: Remi Laudebat, Sophia Antipolis (FR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/757,621

(22) Filed: Dec. 23, 2015

(65) Prior Publication Data
US 2017/0188179 A1  Jun. 29, 2017

(51) Int. Cl.
| | | |
|---|---|---|
| H04B 5/00 | (2006.01) | |
| H04W 4/00 | (2018.01) | |
| H04W 4/80 | (2018.01) | |
| H02J 7/02 | (2016.01) | |
| H04W 4/06 | (2009.01) | |
| H02J 50/40 | (2016.01) | |
| H02J 50/12 | (2016.01) | |

(52) U.S. Cl.
CPC ............ *H04W 4/008* (2013.01); *H04W 4/80* (2018.02); *H02J 7/025* (2013.01); *H02J 50/12* (2016.02); *H02J 50/40* (2016.02); *H04W 4/06* (2013.01)

(58) Field of Classification Search
CPC ........ H04W 4/008; H04W 4/06; H04W 4/08; H02J 7/025; H02J 50/12; H02J 50/40
USPC ...................... 455/41.1, 41.2–41.3
See application file for complete search history.

(56) References Cited

U.S. PATENT DOCUMENTS

| | | | |
|---|---|---|---|
| 8,723,642 B2 | 5/2014 | Park et al. | |
| 2006/0238365 A1* | 10/2006 | Vecchione | G04C 10/00 340/657 |
| 2015/0022016 A1* | 1/2015 | Kim | H02J 5/005 307/104 |
| 2015/0028799 A1* | 1/2015 | Kwan | H02J 7/025 320/108 |
| 2015/0326025 A1* | 11/2015 | Bell | H04W 4/008 307/104 |

(Continued)

FOREIGN PATENT DOCUMENTS

| | | |
|---|---|---|
| EP | 2871746 A1 | 5/2015 |
| KR | 10-2012-0120692 A | 11/2012 |
| WO | 2015/163547 A1 | 10/2015 |

OTHER PUBLICATIONS

Inntemational Search Report and Written Opinion received for International Application No. PCT/US2016/061328, dated Feb. 20, 2017, 14 pages.

(Continued)

*Primary Examiner* — Nay A Maung
*Assistant Examiner* — Angelica M Perez
(74) *Attorney, Agent, or Firm* — Spectrum IP Law Group LLC

(57) ABSTRACT

The disclosure generally relates to a method, system and apparatus to utilized a network of wireless transmission units (PTUs) to communicate between devices connected to the network through each of the PUTs. In certain embodiments, a plurality of PTUs are interconnected into a Local Area Network (LAN) such that messages may be broadcast to all PTUs connected to the network. Each PTU may then relay the broadcast message to each of the mobile devices being under its charge.

29 Claims, 7 Drawing Sheets

(56) References Cited

U.S. PATENT DOCUMENTS

2015/0326068 A1 11/2015 Bell et al.
2017/0265134 A1* 9/2017 Kamath ............ H04W 52/0216

OTHER PUBLICATIONS

International Preliminary Report on Patentability received for International Application No. PCT/US2016/061328, dated Jul. 5, 2018, 11 pages.

* cited by examiner

METHOD, SYSTEM AND APPARATUS FOR COMMUNICATION THROUGH WIRELESS CHARGING NETWORK

BACKGROUND

Field

The disclosure generally relates to method, system and apparatus to establish communication between mobile devices connected to a wireless charging station. Specifically, the specification relates to method, system and apparatus to utilized a network of wireless charging stations (interchangeably, Power Transmission Units (PTUs)) to communicate between devices connected to the network through the PTU network.

Description of Related Art

Wireless charging or inductive charging uses a magnetic field to transfer energy between two devices. Wireless charging can be implemented at a charging station. Energy is sent from one device to another device through an inductive coupling. The inductive coupling is used to charge batteries or run the receiving device. The Alliance for Wireless Power (A4WP) was formed to create industry standard to deliver power through non-radiative, near field, magnetic resonance from the Power Transmitting Unit (PTU) to a Power Receiving Unit (PRU).

The A4WP defines five categories of PRU parameterized by the maximum power delivered out of the PRU resonator. Category 1 is directed to lower power applications (e.g., Bluetooth headsets). Category 2 is directed to devices with power output of about 3.5 W and Category 3 devices have an output of about 6.5 W. Categories 4 and 5 are directed to higher-power applications (e.g., tablets, netbooks and laptops).

PTUs of A4WP use an induction coil to generate a magnetic field from within a charging base station, and a second induction coil in the PRU (i.e., portable device) takes power from the magnetic field and converts the power back into electrical current to charge the battery. In this manner, the two proximal induction coils form an electrical transformer. Greater distances between sender and receiver coils can be achieved when the inductive charging system uses magnetic resonance coupling. Magnetic resonance coupling is the near field wireless transmission of electrical energy between two coils that are tuned to resonate at the same frequency.

Wireless charging is particularly important for fast charging of devices including smartphones, tablets and laptops. There is a need for improved wireless charging systems to extend the communication network between devices connected to each wireless charging node.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Figure 1:
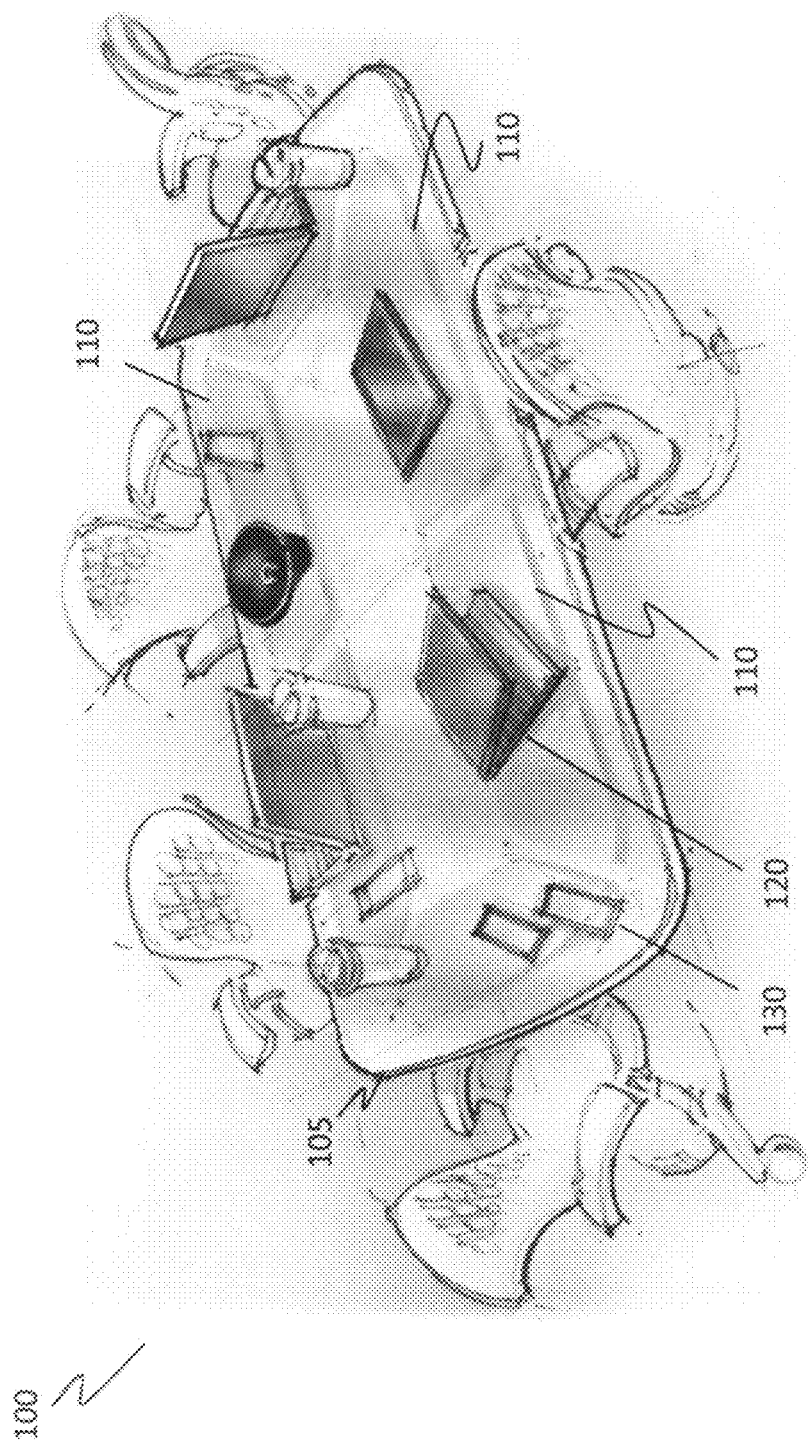
FIG. 1 illustrates an exemplary wireless charging environment according to one embodiment of the disclosure.

Certain embodiments may be used in conjunction with various devices and systems, for example, a mobile phone, a smartphone, a laptop computer, a sensor device, a Bluetooth (BT) device, an Ultrabook™, a notebook computer, a tablet computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Institute of Electrical and Electronics Engineers (IEEE) standards (IEEE 802.11-2012, IEEE Standard for Information technology-Telecommunications and information exchange between systems Local and metropolitan area networks—Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12-TGac Channel Model Addendum Document"); IEEE 802.11 task group ad (TGad) (IEEE 802.11ad-2012, IEEE Standard for Information Technology and brought to market under the WiGig brand—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing Wireless HDTM specifications and/or future versions and/or derivatives thereof, units and/or devices which are part of the above networks, and the like.

Some embodiments may be implemented in conjunction with the BT and/or Bluetooth low energy (BLE) standard. As briefly discussed, BT and BLE are wireless technology standard for exchanging data over short distances using short-wavelength UHF radio waves in the industrial, scientific and medical (ISM) radio bands (i.e., bands from 2400-2483.5 MHz). BT connects fixed and mobile devices by building personal area networks (PANS). Bluetooth uses frequency-hopping spread spectrum. The transmitted data are divided into packets and each packet is transmitted on one of the 79 designated BT channels. Each channel has a bandwidth of 1 MHz. A recently developed BT implementation, Bluetooth 4.0, uses 2 MHz spacing which allows for 40 channels.

Some embodiments may be used in conjunction with one way and/or two-way radio communication systems, a BT device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Electromagnetic induction based Wireless charging and Near Field Communication (NFC) are based on inductive coupling between two coils. Wireless charging based on A4WP uses 6.78 MHz industrial, scientific or medical (ISM) frequency band to deliver power between wireless charger and device, while NFC (and some other RFID technologies) uses 13.56 MHz ISM frequency band to deliver power and data between devices.

FIG. 1 illustrates an exemplary wireless charging environment according to one embodiment of the disclosure. In FIG. 1, conference room 100 is shown with wireless charging pads (i.e., PTUs) 110 positioned on desk 105. Each PTU 110 is designated to support one or more PRUs. While FIG. 1 shows PRUs including laptop 120 and smart devices 130, the disclosed principles are not limited thereto and may include any device capable of wireless charging.

Figure 2:
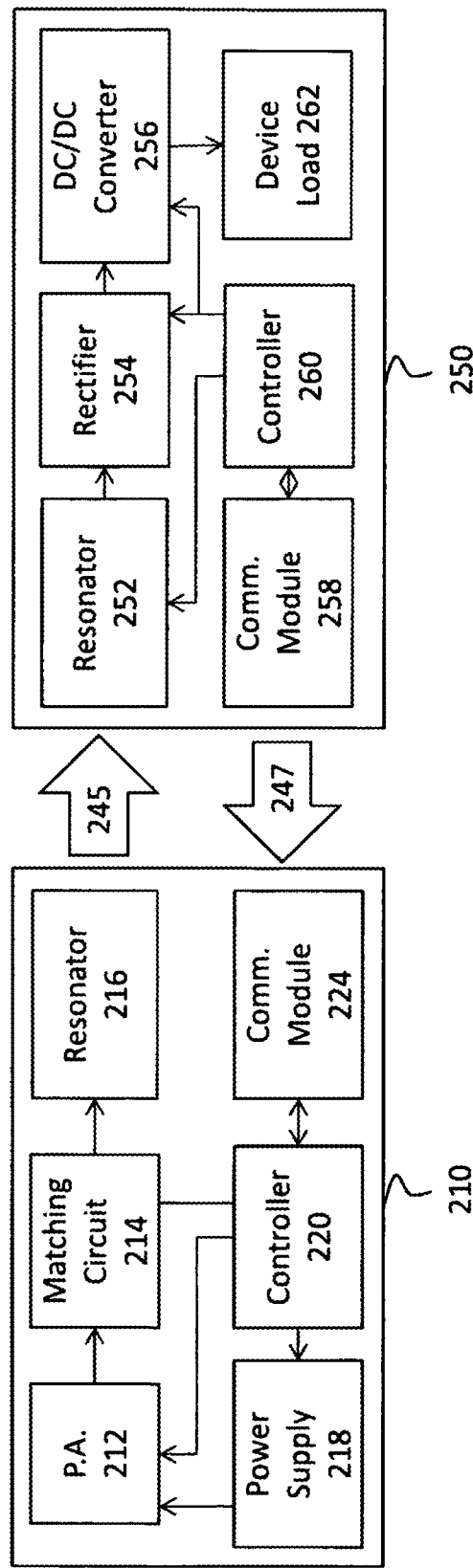
FIG. 2 schematically illustrates conventional A4WP architecture.

FIG. 2 schematically illustrates conventional A4WP architecture. Specifically, FIG. 2 shows PTU 210 and PRU 250. PTU 210 can be any conventional wireless charging station. PTU 210 includes power supply 218, power amplifier (PA) 212, matching circuit 214, controller 220, resonator coil 216 (interchangeably, resonator) and communication module 224. Communication module 224 may define BLE communication platform to transceive BLE packets and to communicate the packets to controller 220. PA 212 receives primary power from power supply 218 (which may be an AC source) and generates an amplified A4WP power signal according to instructions from controller 220. Matching circuit 214 receives A4WP power signals from PA 212 and provides substantially constant power to resonator 216. Resonator 216 may include one or more resonator coils to convert output from matching circuit 214 to magnetic field for a wireless device positioned within the charging zone of PTU 210.

PRU 250 may define any device under charge (DUC) which is proximal to PTU 210. PRU 250 is shown with resonator coil 252, rectifier 254, DC/DC converter 256, communication module 258, controller 260 and device load 262. Communication module 258 includes BLE communication platform to communicate 247 with communication module 224 of PTU 210. Resonator coil 252 receives magnetic field 245 of PTU resonator 216. Rectifier 254 conforms magnetic field (power) received at resonator 252 and provides appropriate signal to DC/DC converter 256. Controller 260 of PRU 250 communicates with resonator 252 and rectifier 254 in order to manage received power. The output of DC/DC converter 256 powers device load (e.g., battery) 262.

Conventional A4WP technology is ubiquitously deployed. Wireless charging stations (i.e., PTUs) are made available at many places such as homes, cars, retail stores, restaurants and coffee shops. Many restaurants and coffee shops are offering free wireless charging to their patrons by placing one or more wireless charging stations at each table. The wireless charging stations allow patrons to charge their mobile devices by simply placing the device on a charging pad associated with the PTU(s) at each table.

Figure 3:
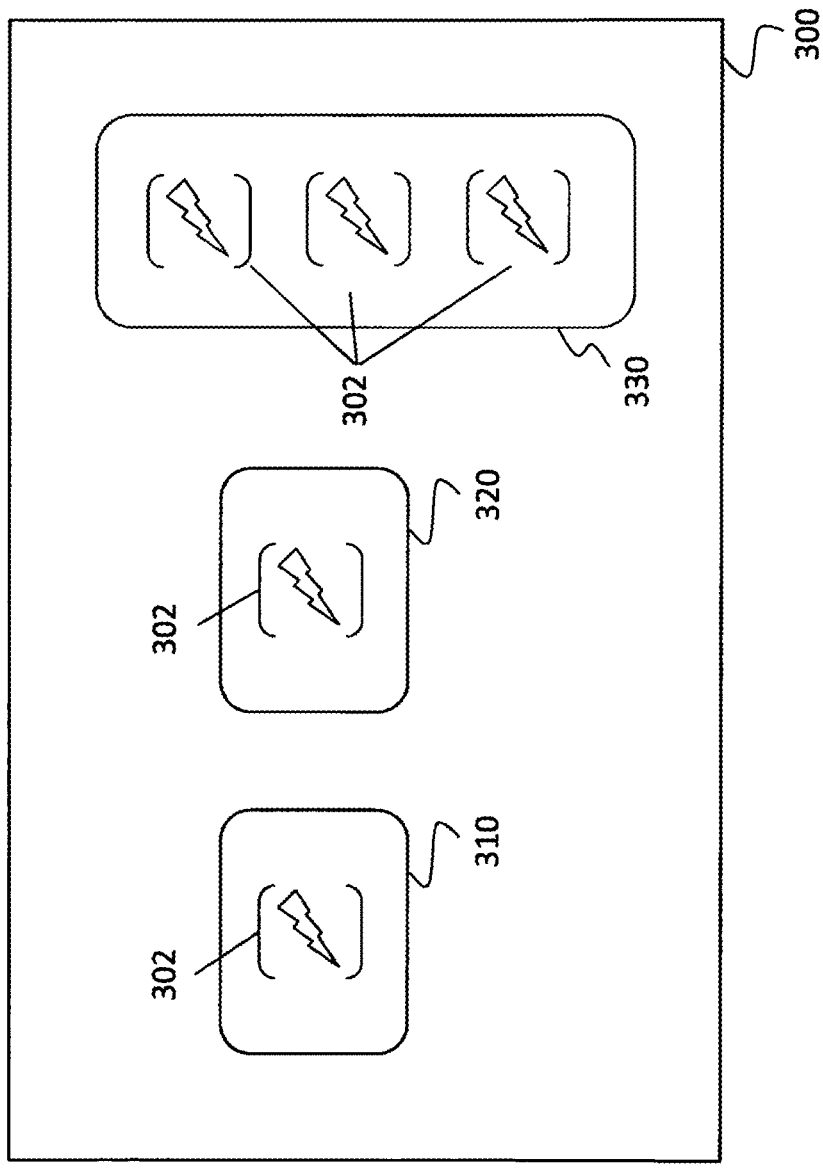
FIG. 3 shows an exemplary establishment having wireless charging stations at each table.

FIG. 3 shows an exemplary establishment having wireless charging stations at each table. The establishment of FIG. 3 may be depict an office space, a coffee shop, a restaurant, a library or any other gathering environment. Environment 300 of FIG. 3 is shown with tables 310, 320 and 330. Each table is shown with one or more PTU 302. Table 330 is shown with three PTUs 302. Each PTU may include one or more charging pads as discussed in relation to FIG. 1. Moreover, each PTU may be configured to simultaneously charge one or more mobile devices. A patron having a portable device can place the device on or near any charging pad 302 to charge the device.

Each of the PTU 302 may be connected to other PTUs in the network. In certain embodiments, the PTUs may communicate with each other through a LAN (not shown) such that each PTU is linked to a common server or to one or more other PTUs. The link between the PTUs and/or between the PTUs and the server may be actual or virtual. Thus, the PTUs form a local area network (LAN or WLAN) in which each PTU acts as an independent node. In certain embodiments, the disclosure provides method, system and apparatus to enable communication between a patron's DUC to communicate with other patrons using the PTU network of environment 300. The patron's DUC may engage in BLE communication with PTU 302. The PTU 302 may be connected to other PTUs 302 in environment 300, thus relaying communication between the DUCs. The communication may include sending messages, pictures, audio, video and data to any other DUC or a group of DUCs without further interaction from the user.

The A4WP standard uses BLE technology for signaling between the PTU and the PRU (interchangeably, DUC) while the device is being charged. In one exemplary embodiment, the BLE data link is used for communication purposes other than charging purposes. By connecting the PTU nodes in the environment to form a LAN or WLAN, the PTUs may be used to communicate data between all DUCs.

Figure 4:
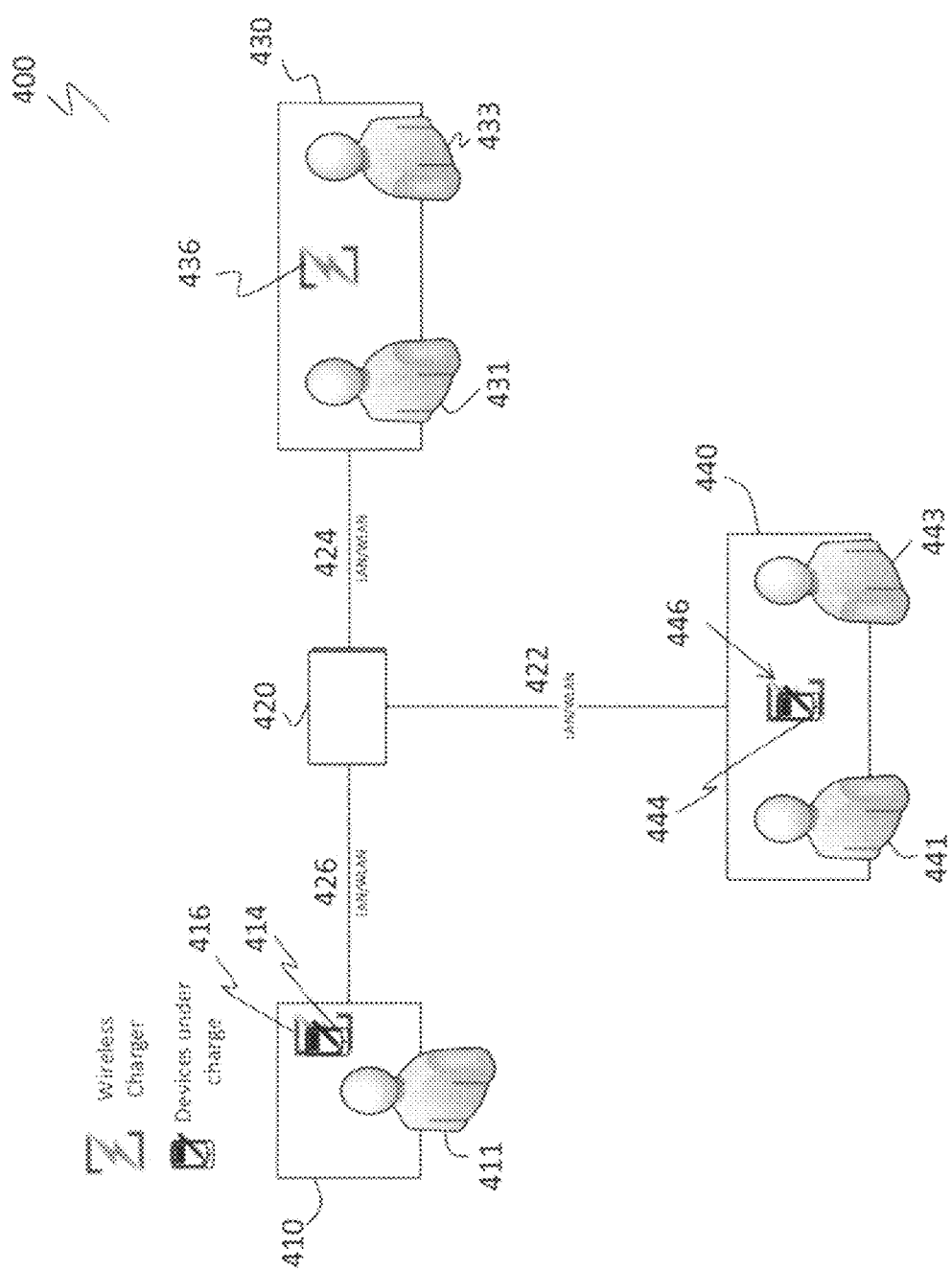
FIG. 4 schematically illustrates an implementation of an exemplary embodiment of the disclosure.

FIG. 4 schematically illustrates an implementation of an exemplary embodiment of the disclosure. System 400 of FIG. 4 includes tables 410, 430 and 440. Each table includes at least one wireless charger (PTU). Table 410 includes PTU 416, table 430 includes PTU 436 and table 440 includes PTU 446. One or more user is associated with each table. That is, user 411 is at table 410, users 431 and 433 are at table 430 and users 441 and 443 are at table 440. Each user may have one or more user device to be charged by a PTU. At table 410, user 411 is charging device 414 at PTU 416. Pursuant to the A4WP standard, DUC 414 engages in BLE signaling with PTU 416. At table 430, users 431 and 433 do not have a chargeable device and PTU 436 remains open. At table 440, users 441 and 443 may share PTU 446. In FIG. 4, only device 444 is under charge by PTU 446.

FIG. 4 also shows server 420 connecting PTUs 416, 436 and 446. Server 420 may comprise the establishment's own server or a cloud-based server configured to communicate with each of the PTUs of environment 400. In an exemplary embodiment, the connection between PTU 414 and server 420 is shown as link 426. The connection between server 420 and PTU 436 is shown as link 424. The connection between server 420 and PTU 446 is shown as link 422. The connections may be WiFi and/or LAN connections.

By connecting the PTUs through server 420, additional capacity is provided to both device under charge and the PTU to thereby exchange more data than the limits defined by the A4WP standard. The system of FIG. 4 allows customers to communicate with other customers either selectively or collectively. In addition, broadcast messages can be sent through server 420 to all customers. For example, the establishment may broadcast a discount coupon to all devices being charged at each table (i.e., DUC 414 and DUC 444)

In an exemplary embodiment, the user 411 may desire to communicate with user 441 at table 440 through the PTU network and server 420. User 411 may start an applet ("app") at device 414 to engage application of the PTU network through server 420. The app may then display a map of the establishment, showing all active tables and/or devices as illustrated at FIG. 4. User 411 may then select the table and/or the user for communication. Once the user and/or table is selected, user 411 may send and receive messages through the illustrated PTU network. Notably, the embodiment of FIG. 4 does not require interaction from 2 persons to establish a person-to-person (P2P) communication. Rather, it is sufficient to identify a table or a PTU to engage in communication.

In an exemplary application, two users may be taking a coffee break and charging their devices (not shown) on the table 430. The first user may want to share a video with the second user. By using the disclosed embodiment, the user need not start a WLAN P2P discovery or BT pairing to start an object push profile (OPP) connection. All the P2P discovery mechanism may be offloaded to the wireless charger network.

In another exemplary embodiment, the establishment owner can propose a discount to all customers engaged through the PTU network in environment 400. The owner may use the PTU network to send a coupon to all customers charging their device in the shop. In another implementation, the owner may communicate a coupon or a promotion to select few tables and/or individuals. In either application the owner need not know P2P contact information for the desired recipient(s) to propagate the information.

Figure 5:
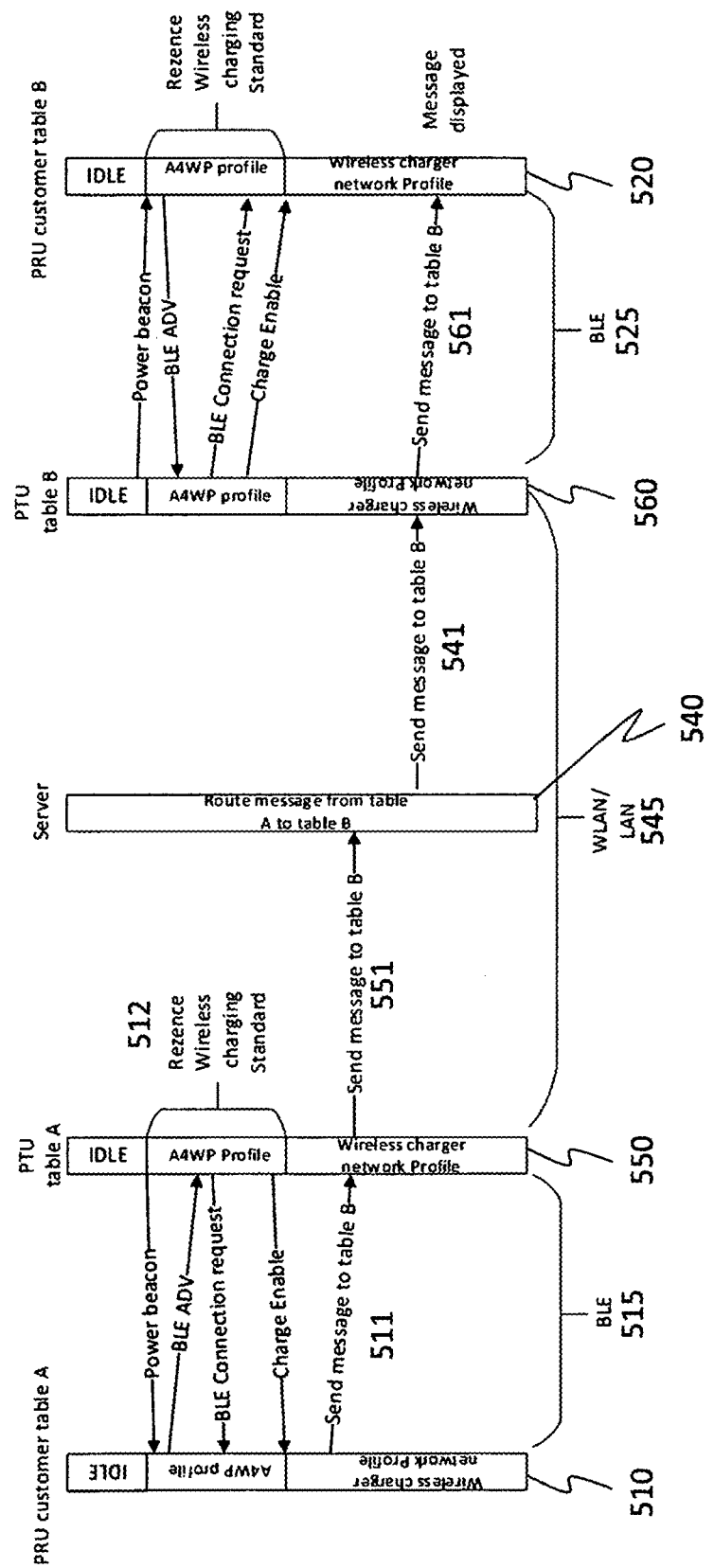
FIG. 5 is an exemplary communication diagram according to one embodiment of the disclosure.

FIG. 5 is an exemplary communication diagram according to one embodiment of the disclosure. In FIG. 5, bar 510 represents a first customer's PRU positioned at Table A and bar 520 represents a second customer's PRU positioned at Table B. The server is represented by bar 540. The PTU at the first table (Table A) is represented by bar 550 and the PTU at the second table 560 is represented by bar 560. While FIG. 5 is shown only with two tables, the disclosure is not limited to two tables and may be expanded without departure from the disclosed principles.

As illustrated at bars 510 and 520, each PRU may be at one of three states: idle, A4WP profile exchange and wireless charger network profile. Similarly, each of PTUs 550 and 560 may be at one of Idle, A4WP profile or Wireless charger network profile states. Server 540 is shown with one state. Among other functions, server 540 routes messages between PTUs and between system administrator and the PTUs.

During application, customer A's PRU may be at idle state when it engages PTU device at table A. Once engaged at Rezence state 512, the PTU at Table A sends a power beacon to the customer's PRU. The PRU responds by sending a BLE advertisement. In response to the BLE advertisement, the PTU sends a BLE connection request to the PRU requesting A4WP profile from the PRU at Table A. Finally, the PTU enables charging of the PRU at Table 1. The same steps are shown for wirelessly charging the PRU device at Table B with its corresponding PTU at Table B.

If the customer at Table A decides to transmit a message to the customer at Table B, the customer may communicate a message to the PTU at table A as shown in step 511. The message may be a BLE message transmitted from PRU 510 to PTU 550. PTU 550 may communicate message 511 to server 540 as shown by arrow 551. In doing so, BLE message 511 may be re-packet in one or more data packets appropriate for communication between PTU 550 (and PTU 520) and server 540. Upon receiving message 551, server 540 may identify source and destination of the message and relay it to PTU at Table B as shown by arrow 541. PTU at Table B, which is already engaged in Rezence wireless charging with PRU 520 may then re-packet the incoming message and transmit to the PRU customer at Table B. This step is shown as step 561. In one embodiment, the communication between the PTUs and PRUs may be a BLE communication. In another embodiment, the communication between PTU and the PRU may include Wi-H, Cellular, Wi-Gig or other non-BLE communication forms.

Figure 6:
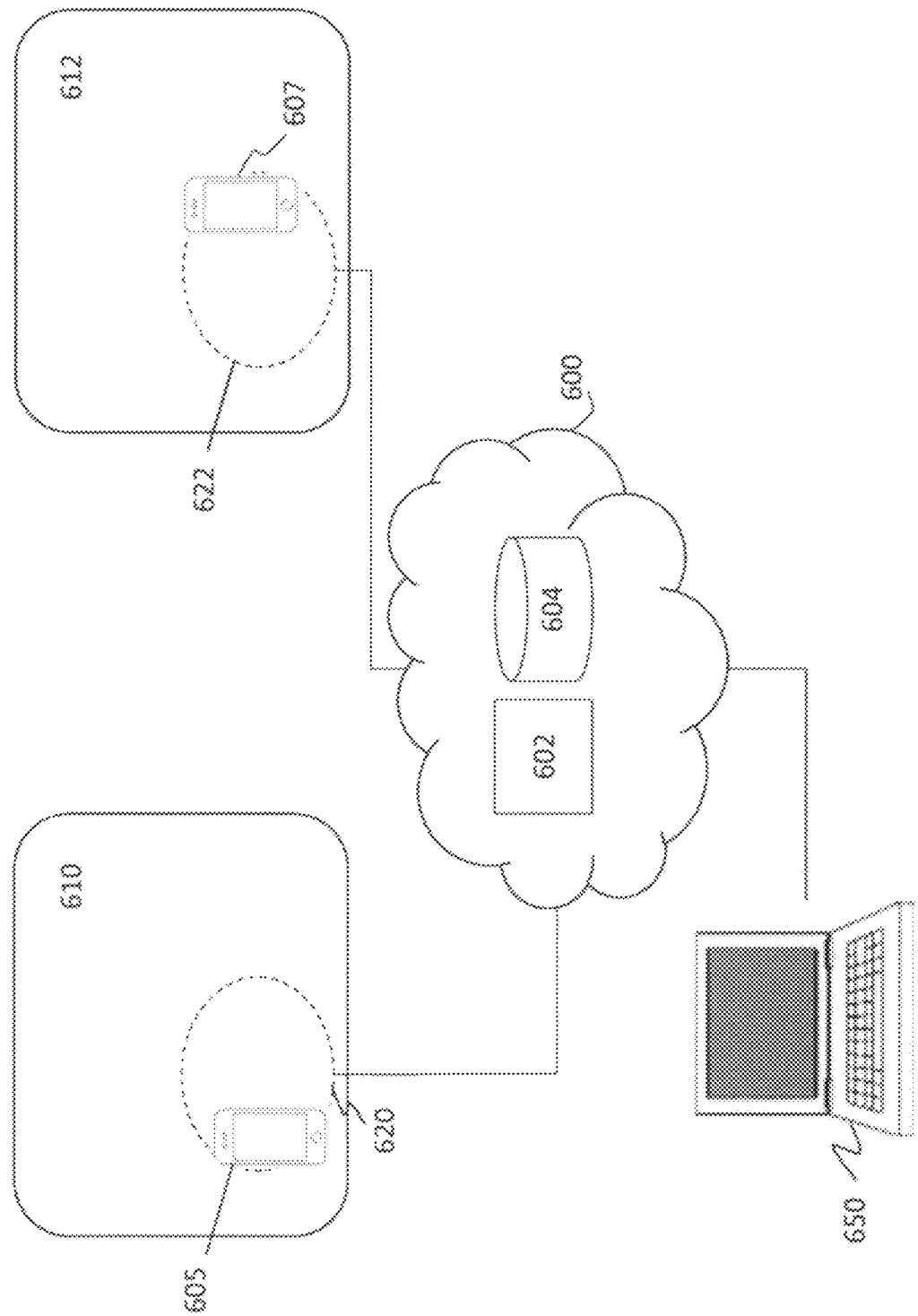
FIG. 6 schematically illustrates an exemplary system according to one embodiment of the disclosure.

FIG. 6 schematically illustrates an exemplary system according to one embodiment of the disclosure. In FIG. 6, tables 610 and 612 support PTU 620 and 622, respectively. Device 605 is being charged by PTU 620 and device 607 is being charged by PTU 622. PTU 622 and 620 are connected to cloud server 600. Cloud server may be a local server or a remote server. Cloud server includes processing circuitry 602 and memory circuitry 604. The processing circuitry 602 and the memory circuitry 604 may define hardware, software or a combination of hardware and software. For example, processor 602 mAy comprise a virtual processor programmed to work with applets which may optionally reside on each DUC 605, 607. Processing circuitry 602 and memory circuitry 604 may define a server for the PTU LAN of FIG. 6.

While not shown, each of DUC 605, 607 may further comprise applets for sending/receiving messages through a PTU. Each device may be prompted to download the applet upon its initial introduction to the PTU. The applet may run in the background and be triggered when the device is at or near the PTU or when the device is being profiled by the PTU.

Memory circuitry may be a non-transitory computer-readable medium containing a set of instructions to cause processor circuitry 602 to receive BLE messages at PTU 620. The message may be a BLE message defined by A4WP standards and communicated from device 605 (while being charged) to PTU 620. The instructions may also direct processing circuitry to convert BLE messages from DUC 605 non-BLE message contents and transmit the non-BLE message content from PTU 620 to PTU 622 and/or to computer 650. Computer 650 may define any device used by system administrator or a an authorized user to access the PTU LAN network of FIG. 6. The instructions may also direct PTU 622 to convert the non-BLE messages to BLE messages for communication with DUC 607.

Computer 650 may be linked to cloud 600. Cloud 600 may be linked directly to one or more other computers, laptops and smart devices so as to allow the system administrator (or others with access credentials) to propagate messages through the PTU network. Thus, the system administrator may send messages to the PRUs engaged with one or more of the PTUs.

Figure 7:
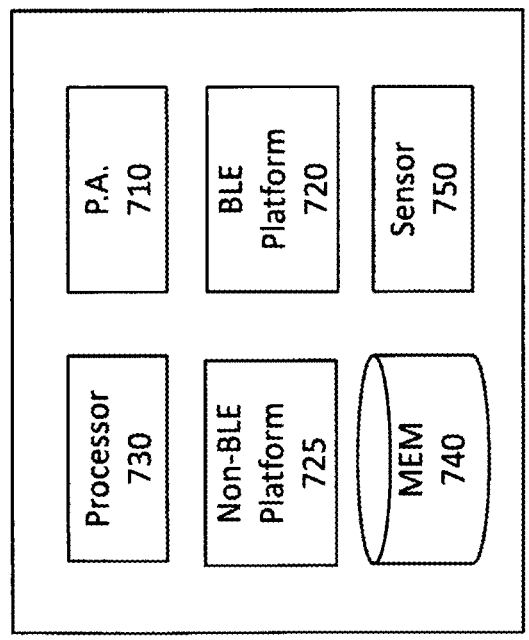
FIG. 7 shows an exemplary PTU according to one embodiment of the disclosure.

FIG. 7 shows an exemplary PTU according to one embodiment of the disclosure. PTU 700 of FIG. 7 comprises wireless charging circuitry including PA 710 to electromagnetically charge one or more DUCs. BLE communication platform 720 communicates with A4WP-compliant devices to exchange BLE messages. Non-BLE platform 725 may optionally be included to communicate in modes other than BLE. Processing circuitry (interchangeably, processor 730) may be optionally used to convert the A4WP-Compliant BLE messages to non-BLE messages at PTU 700. For example, processor 730 may be configured to convert content of BLE messages received from a A4WP-compliant DUC to non-BLE messages. The non-BLE messages may be packetized for communication through a non-BLE communication platform.

In still another embodiment, PTU 700 may direct BLE messages to a server (not shown). If used, non-BLE communication platform 725 may communicate non-BLE messages to a second PTU, a server or a smart device. Memory 740 may store instructions for other components of PTU 700. For example, memory 740 may store instructions to direct processor 730 to run applets and/or other algorithm discussed herein. Processor 730 and memory circuit 740 may be hardware, software or a combination of hardware and software. Further processor 730 and memory circuit 740 may be integrated. Sensor 750 may comprise one or more sensors used in conventional PTUs. Such sensors may detect temperature, pressure or movement.

In one embodiment of the disclosure, processor 730 may be configured by instructions stored at memory circuit 740 to direct a second PTU (not shown) to communicate non-BLE messages to a second DUC associated with the second PTU. The processor may be further configured by instructions stored at memory circuit 740 to direct the second PTU to communicate non-BLE messages to a plurality of DUCs associated with the second PTU. In certain embodiments, non-BLE communication platform 725 may be configured to form a non-Internet Protocol (non-IP) communication link with a second PTU (not shown) to transmit non-BLE messages.

The following exemplary and non-limiting embodiments are presented to further illustrate different embodiment of the disclosure. Example 1 relates to a Power Transmission Unit (PTU), comprising: a wireless charging circuitry including a power amplifier to electromagnetically charge a first device under charge (DUC); a Bluetooth Low Energy (BLE) communication platform to communicate a plurality of A4WP-Compliant BLE messages with the first DUC; and a processing circuitry to convert the plurality of A4WP-Compliant BLE messages to non-BLE messages; and a non-BLE communication platform to communicate non-BLE messages to a second PTU.

Example 2 relates to the PTU of example 1, wherein the processing circuitry is further configured to direct the second PTU to communicate non-BLE messages to a second DUC associated with the second PTU.

Example 3 relates to the PTU of any preceding example, wherein the processing circuitry is further configured to direct the second PTU to communicate non-BLE messages to a plurality of DUCs associated with the second PTU.

Example 4 relates to the PTU of any preceding example, wherein the non-BLE communication platform defines one or more of WiFi, LAN or cellular communication platforms.

Example 5 relates to the PTU of any preceding example, wherein the non-BLE communication platform is further configured to form an actual link, a virtual link or a combination of actual and virtual links with the second PTU.

Example 6 relates to the PTU of any preceding example, wherein the non-BLE communication platform is further configured to form a non-Internet Protocol (non-IP) communication link with the second PTU to transmit non-BLE messages.

Example 7 relates to a non-transitory computer-readable medium containing a set of instructions to cause a processor circuitry to perform a process comprising: receiving a BLE message at a first PTU, the BLE message defined by A4WP standards and communicated from a first device under charge (DUC) to the first PTU associated therewith; converting the first BLE message content to a non-BLE message content at the first PTU; transmitting the non-BLE message content from the first PTU to a second PTU; and communicating the non-BLE message content form the second PTU to a second DUC associated with the second PTU by BLE signaling.

Example 8 relates to the medium of any preceding example, wherein transmitting the non-BLE message content form the second PTU to a second DUC further comprises converting the non-BLE message content to a BLE message at the second PTU and communicating the BLE message to the second DUC compliant with A4WP Standard.

Example 9 relates to the medium of any preceding example, further comprising transmitting the non-BLE message content from the first PTU to the second PTU through a server connected to each of the first and the second PTU through an actual link, a virtual link or a combination of actual and virtual links.

Example 10 relates to the medium of any preceding example, further comprising propagating the BLE message from the first PTU to a plurality of PTUs through the server and directing each of the plurality of PTUs to communicate the message to at least one DUC associated with each of the respective plurality of PTUs.

Example 11 relates to the medium of any preceding example, further comprising transmitting the non-BLE message content from the first PTU to the second PTU by directly linking the first PTU to the second PTU.

Example 12 relates to the medium of any preceding example, further comprising simultaneously electromagnetically charging each of the first and the second DUCs by the first and the second PTUs, respectively.

Example 13 relates to the medium of any preceding example, wherein the non-BLE message content is communicated by one of Wi-Fi, LAN or cellular signaling.

Example 14 relates to the medium of any preceding example, wherein the first DUC identifies the second DUC in the BLE message.

Example 15 relates to a method to communicate between two or more wireless devices through a Power Transmission Unit (PTU) network, the method comprising: receiving a BLE message at a first PTU, the BLE message defined by A4WP standards and communicated from a first device under charge (DUC) to the first PTU associated therewith; converting the first BLE message content to a non-BLE message content at the first PTU; transmitting the non-BLE message content from the first PTU to a second PTU; and communicating the non-BLE message content form the second PTU to a second DUC associated with the second PTU by BLE signaling.

Example 16 relates to method of any preceding example, wherein transmitting the non-BLE message content form the second PTU to a second DUC further comprises converting the non-BLE message content to a BLE message at the second PTU and communicating the BLE message to the second DUC compliant with A4WP Standard.

Example 17 relates to the method of any preceding example, further comprising transmitting the non-BLE message content from the first PTU to the second PTU through a server connected to each of the first and the second PTU through an actual link, a virtual link or a combination of actual and virtual links.

Example 18 relates to the method of any preceding example, further comprising propagating the BLE message from the first PTU to a plurality of PTUs through the server and directing each of the plurality of PTUs to communicate the message to at least one DUC associated with each of the respective plurality of PTUs.

Example 19 relates to the method of any preceding example, further comprising transmitting the non-BLE message content from the first PTU to the second PTU by directly linking the first PTU to the second PTU.

Example 20 relates to the method of any preceding example, further comprising simultaneously electromagnetically charging each of the first and the second DUCs by the first and the second PTUs, respectively.

Example 21 relates to the method of any preceding example, wherein the non-BLE message content is communicated by one of Wi-Fi, LAN or cellular signaling.

Example 22 relates to the method of any preceding example, wherein the first DUC identifies the second DUC in the BLE message.

Example 23 relates to a machine-readable storage including machine-readable instructions, when executed, to implement a method or realize an apparatus as provided in any preceding example.

Example 24 relates to a local network, comprising: a plurality of Power Transmission Units (PTUs), a first of the plurality of the PTUs having: a wireless charging circuitry to electromagnetically charge a first device under charge (DUC) associated with therewith, a Bluetooth Low Energy (BLE) communication platform to communicate BLE messages between the first PTU and the first DUC, and a processing circuitry to convert BLE messages to non-BLE messages; a server linked to each of the plurality of PTUs, the server configured to transmits non-BLE messages from the first PTU to a second of the plurality of PTUs.

Example 25 relates to the network of any preceding example, wherein the first PTU further comprises a non-BLE communication platform to communicate non-BLE messages to the server.

Example 26 relates to the network of any preceding example, wherein the server is further configured to direct the second of the plurality of PTUs to propagate the non-BLE messages in BLE format to a second DUC associated with the second PTU.

Example 27 relates to the network of any preceding example, wherein the server is further configured to direct the second of the plurality of PTUs to propagate the non-BLE message to a plurality of DUCs associated with the second PTU.

Example 28 relates to the network of any preceding example, wherein non-BLE messages are communicated through one of more of WiFi, WiLAN or cellular communication platforms.

Example 29 relates to the network of any preceding example, wherein the server comprises a network server or a cloud-based server and wherein the link is an actual link, a virtual link or a combination of actual and virtual links.

Example 30 relates to the network of any preceding example, wherein the server comprises a non-Internet Protocol (non-IP) communication platform to transmit non-BLE messages.

Example 31 relates to a Power Transmission Unit (PTU) network to communicate between two or more wireless chargeable devices, comprising: means for receiving a BLE message at a first PTU, the BLE message defined by A4WP standards and communicated from a first device under charge (DUC) to the first PTU associated therewith; means for converting the first BLE message content to a non-BLE message content at the first PTU; means for transmitting the non-BLE message content from the first PTU to a second PTU; means for communicating the non-BLE message content form the second PTU to a second DUC associated with the second PTU by BLE signaling.

Example 32 relates to the PTU of any preceding example, wherein transmitting the non-BLE message content form the second PTU to a second DUC further comprises converting the non-BLE message content to a BLE message at the second PTU and communicating the BLE message to the second DUC compliant with A4WP Standard.

Example 33 relates to the PTU of any preceding example, further comprising means for transmitting the non-BLE message content from the first PTU to the second PTU through a server connected to each of the first and the second PTU through an actual link, a virtual link or a combination of actual and virtual links.

Example 34 relates to the PTU of any preceding example, further comprising means for propagating the BLE message from the first PTU to a plurality of PTUs through the server and directing each of the plurality of PTUs to communicate the message to at least one DUC associated with each of the respective plurality of PTUs.

Example 35 relates to the PTU of any preceding example, further comprising means for transmitting the non-BLE message content from the first PTU to the second PTU by directly linking the first PTU to the second PTU.

Example 36 relates to the PTU of any preceding example, further comprising means for simultaneously electromagnetically charging each of the first and the second DUCs by the first and the second PTUs, respectively.

Example 37 relates to the PTU of any preceding example, wherein the non-BLE message content is communicated by one of Wi-Fi, LAN or cellular signaling.

While the principles of the disclosure have been illustrated in relation to the exemplary embodiments shown herein, the principles of the disclosure are not limited thereto and include any modification, variation or permutation thereof.

What is claimed is:

1. A first Power Transmission Unit (PTU), comprising:
a wireless charging circuitry including a power amplifier to electromagnetically charge a first device under charge (DUC);
a Bluetooth Low Energy (BLE) communication platform to communicate a plurality of A4WP-Compliant BLE messages with the first DUC, wherein the plurality of A4WP-Compliant BLE messages of the first DUC are destined for a second DUC associated with a second PTU; and
a processing circuitry to convert the plurality of A4WP-Compliant BLE messages to non-BLE messages; and
a non-BLE communication platform to communicate the non-BLE messages to the second PTU to be relayed by the second PTU as A4WP-Compliant BLE messages to the second DUC.

2. The PTU of claim 1, wherein the processing circuitry is further configured to direct the second PTU to communicate the non-BLE messages to a second DUC associated with the second PTU.

3. The PTU of claim 1, wherein the processing circuitry is further configured to direct the second PTU to communicate non-BLE messages to a plurality of DUCs associated with the second PTU.

4. The PTU of claim 1, wherein the non-BLE communication platform defines one or more of WiFi, LAN or cellular communication platforms.

5. The PTU of claim 1, wherein the non-BLE communication platform is further configured to form an actual link, a virtual link or a combination of actual and virtual links with the second PTU.

6. The PTU of claim 5, wherein the non-BLE communication platform is further configured to form a non-Internet Protocol (non-IP) communication link with the second PTU to transmit non-BLE messages.

7. A non-transitory computer-readable medium containing a set of instructions to cause a processor circuitry to perform a process comprising:
receiving a BLE message at a first PTU, the BLE message defined by A4WP standards and communicated from a first device under charge (DUC) to the first PTU associated therewith, wherein the BLE message of the first DUC is destined for a second DUC associated with a second PTU;
converting the first BLE message content to a non-BLE message content at the first PTU;
transmitting the non-BLE message content from the first PTU to the second PTU;
converting the non-BLE message contents to one or more BLE messages; and
communicating the one or more BLE messages from the second PTU to the second DUC associated with the second PTU by BLE signaling.

8. The medium of claim 7, wherein transmitting the non-BLE message content from the second PTU to a second DUC further comprises converting the non-BLE message content to a BLE message at the second PTU and communicating the BLE message to the second DUC compliant with A4WP Standard.

9. The medium of claim 7, further comprising transmitting the non-BLE message content from the first PTU to the second PTU through a server connected to each of the first and the second PTU through an actual link, a virtual link or a combination of actual and virtual links.

10. The medium of claim 9, further comprising propagating the BLE message from the first PTU to a plurality of PTUs through the server and directing each of the plurality of PTUs to communicate the message to at least one DUC associated with each of the respective plurality of PTUs.

11. The medium of claim 7, further comprising transmitting the non-BLE message content from the first PTU to the second PTU by directly linking the first PTU to the second PTU.

12. The medium of claim 7, further comprising simultaneously electromagnetically charging each of the first and the second DUCs by the first and the second PTUs, respectively.

13. The medium of claim 7, wherein the non-BLE message content is communicated by one or more of Wi-Fi, LAN or cellular signaling.

14. The medium of claim 7, wherein the first DUC identifies the second DUC in the BLE message.

15. A method to communicate between two or more wireless devices through a Power Transmission Unit (PTU) network, the method comprising:
receiving a BLE message at a first PTU, the BLE message defined by A4WP standards and communicated from a first device under charge (DUC) to the first PTU associated therewith, the BLE messages from the first DUC intended for a second DUC associated with a second PTU;
converting the first BLE message content to a non-BLE message content at the first PTU;
transmitting the non-BLE message content from the first PTU to the second PTU;
converting the non-BLE message content to one or more BLE messages at the second PTU; and
communicating the non-BLE message content from the second PTU to the second DUC associated with the second PTU by BLE signaling.

16. The method of claim 15, wherein transmitting the non-BLE message content from the second PTU to a second DUC further comprises converting the non-BLE message content to a BLE message at the second PTU and communicating the BLE message to the second DUC compliant with A4WP Standard.

17. The method of claim 15, further comprising transmitting the non-BLE message content from the first PTU to the second PTU through a server connected to each of the first and the second PTU through an actual link, a virtual link or a combination of actual and virtual links.

18. The method of claim 17, further comprising propagating the BLE message from the first PTU to a plurality of PTUs through the server and directing each of the plurality of PTUs to communicate the message to at least one DUC associated with each of the respective plurality of PTUs.

19. The method of claim 15, further comprising transmitting the non-BLE message content from the first PTU to the second PTU by directly linking the first PTU to the second PTU.

20. The method of claim 15, further comprising simultaneously electromagnetically charging each of the first and the second DUCs by the first and the second PTUs, respectively.

21. The method of claim 15, wherein the non-BLE message content is communicated by one or more of Wi-Fi, LAN or cellular signaling.

22. The method of claim 15, wherein the first DUC identifies the second DUC in the BLE message.

23. A local network, comprising:
  a plurality of Power Transmission Units (PTUs), a first of the plurality of the PTUs having:
    a wireless charging circuitry to electromagnetically charge a first device under charge (DUC) associated with therewith,
    a Bluetooth Low Energy (BLE) communication platform to communicate BLE messages between the first PTU and the first DUC, and
    a processing circuitry to convert BLE messages to non-BLE messages at the first PTU; and
  a server linked to each of the plurality of PTUs, the server configured to transmits non-BLE messages from the first PTU to a second of the plurality of PTUs, the server further configured to direct each of the plurality of PTUs to relay the non-BLE messages to at least one other DUC associated with a second of the plurality of PTUs;
  wherein the server is further configured to direct the second PTU to convert the non-BLE messages to one or more BLE messages and to transmit the one or more BLE messages to a second DUC associated with the second PTU.

24. The network of claim 23, wherein the first PTU further comprises a non-BLE communication platform to communicate non-BLE messages to the server.

25. The network of claim 23, wherein the server is further configured to direct the second of the plurality of PTUs to propagate the non-BLE messages in BLE format to a third DUC associated with the second PTU.

26. The network of claim 23, wherein the server is further configured to direct the second of the plurality of PTUs to propagate the non-BLE message to a plurality of DUCs associated with the second PTU.

27. The network of claim 23, wherein non-BLE messages are communicated through one or more of WiFi, WiLAN or cellular communication platforms.

28. The network of claim 23, wherein the server comprises a network server or a cloud-based server and wherein the link is an actual link, a virtual link or a combination of actual and virtual links.

29. The network of claim 23, wherein the server comprises a non-Internet Protocol (non-IP) communication platform to transmit the non-BLE messages.

* * * * *